United States Patent [19]

Iwamoto et al.

[11] Patent Number: 5,068,527
[45] Date of Patent: Nov. 26, 1991

[54] WIDE RANGE FIBER OPTICAL DISPLACEMENT SENSOR

[75] Inventors: Katsuharu Iwamoto; Osamu Kawakami; Hideo Miyagawa, all of Kanagawa, Japan

[73] Assignee: Kabushiki Kaisha Toshiba, Kawasaki, Japan

[21] Appl. No.: 573,561

[22] Filed: Aug. 28, 1990

Related U.S. Application Data

[63] Continuation-in-part of Ser. No. 399,113, Aug. 28, 1989, Pat. No. 4,996,418, which is a continuation-in-part of Ser. No. 127,983, Dec. 3, 1987, abandoned.

[30] Foreign Application Priority Data

Jan. 7, 1987 [JP] Japan .................................. 62-000501
Aug. 23, 1988 [JP] Japan .................................. 63-207423
Dec. 27, 1988 [JP] Japan .................................. 63-327901

[51] Int. Cl.[5] .............................................. H01J 5/16
[52] U.S. Cl. ........................... 250/227.21; 250/227.11; 250/577
[58] Field of Search .................... 250/227.11, 227.21, 250/577, 231.11, 231.19; 356/4, 1

[56] References Cited

U.S. PATENT DOCUMENTS 4,596,925 6/1986 Gilby ............................. 250/227.21
4,687,927 8/1987 Iwamoto et al. ............... 250/227.21

Primary Examiner—David C. Nelms
Assistant Examiner—Khaled Shami
Attorney, Agent, or Firm—Foley & Lardner

[57] ABSTRACT

A fiber optical displacement sensor having a wider range of measurable distances and displacements. The fiber optical displacement sensor includes a light source means for continuously providing a projection beam of a certain wavelength and a reference beam having another different wavelength. The projection beam and the reference beam are combined by a first photo coupler and transmitted through a projecting optical fiber. Only the projection beam is separated out by a first filter and transmitted to a vicinity of the surface to be measured. On the other hand, the reflection beam and the reference beam separated by the first filter are combined by a second photo coupler, transmitted through a receiving optical fiber, and separated out by a second filter before being processed.

13 Claims, 21 Drawing Sheets

NA=0.08
θ=5°
L=3mm

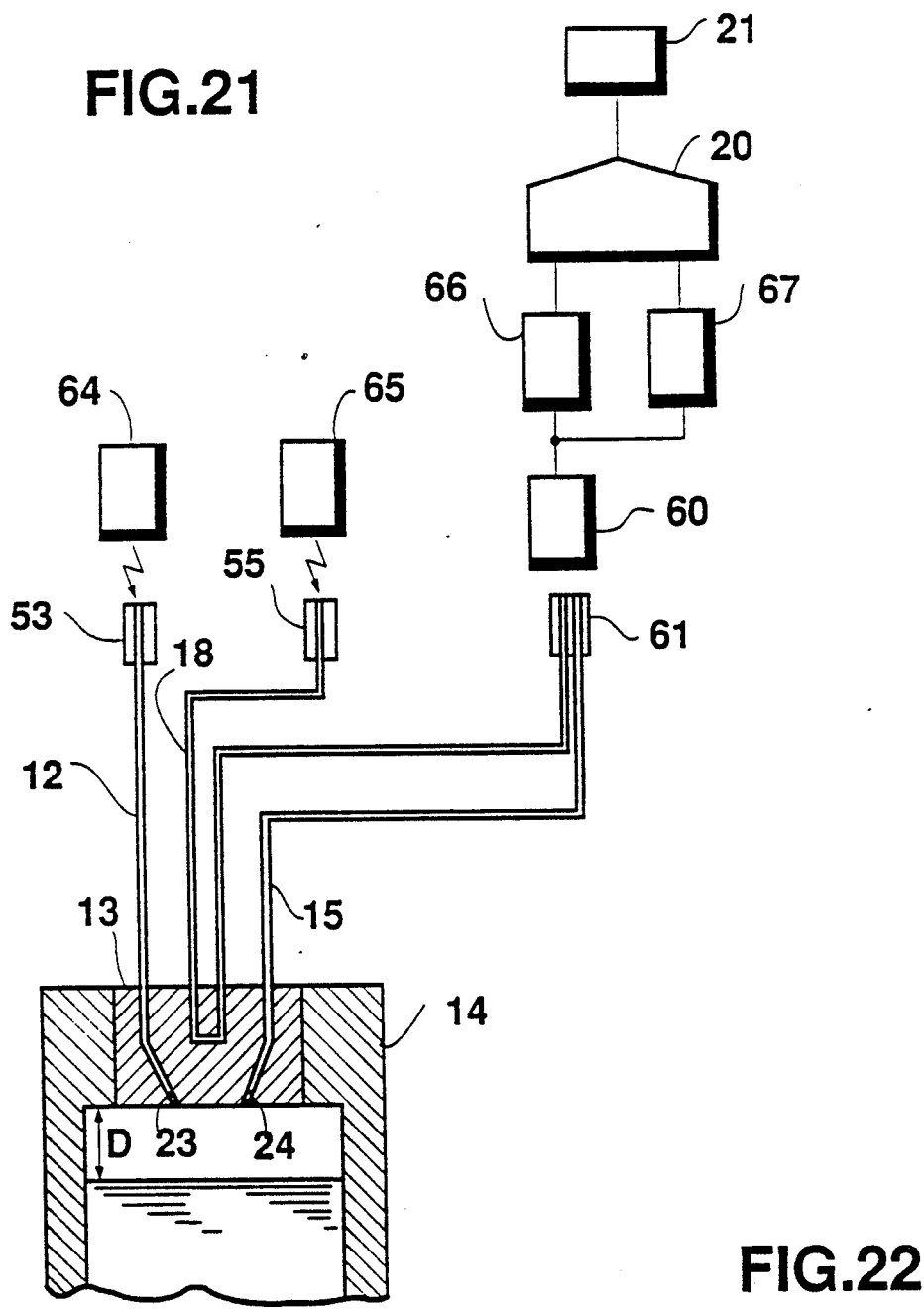
FIG.21
FIG.22 (A)    FIG.22 (B)
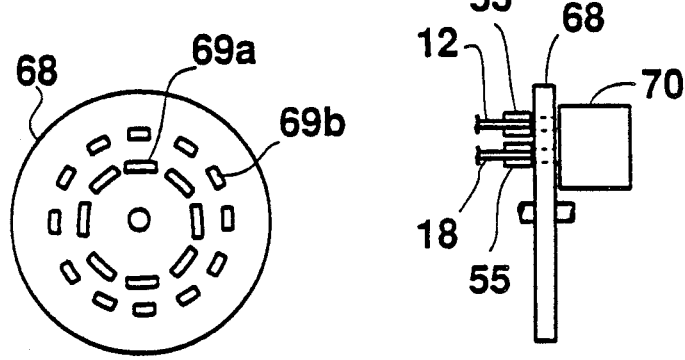

WIDE RANGE FIBER OPTICAL DISPLACEMENT SENSOR

This is a continuation-in-part application of our earlier copending, commonly assigned application Ser. No. 07/399,113 filed Aug. 28, 1989, now U.S. Pat. No. 4,996,418, which is a continuation-in-part application of application Ser. No. 07/127,983 filed Dec. 3, 1987, now abandoned.

BACKGROUND OF THE INVENTION

1. Field of the Invention

The present invention relates to a fiber optical displacement sensor to be used in a liquid level sensor, a pressure gauge or a thermometer.

2. Description of the Background Art

A fiber optical displacement sensor has been utilized in various fields. A most common application includes that in determining a distance to the target, such as in a liquid level sensor for detecting a position of a liquid surface to determine an amount of liquid in a container.

In a typical such liquid level sensor using a fiber optical displacement sensor, a light beam from a light source is projected, through a projecting optical fiber between the light source and a sensor head, onto a surface of the liquid contained in a container located below the sensor head. A reflected beam is received, through a receiving optical fiber between the sensor head and a first photo diode, by the first photo, diode. Such a liquid level sensor is also equipped with a reference optical fiber which propagates the light beam from the light source to a second photo diode, along the projecting optical fiber and the receiving optical fiber, through the sensor head, but without projecting the light beam on the liquid surface. A reflection signal from the first photo diode and a reference signal from the second photo diode are arithmetically operated by an operational circuit to adjust effects such as light intensity fluctuation due to external disturbances, and an accurate measurement value is obtained by an output adjusting circuit which derives a correspondence between a signal from the operational circuit and a liquid level.

Such a conventional liquid level sensor using a fiber optical displacement sensor is known to have the following problems.

First, it has been known that a conventional fiber optical displacement sensor has a rather limited range of measurable distances or displacements so that its use has been limited to applications in which only short distances are dealt with.

Second, such a conventional liquid level sensor usually incorporates optical fiber multi-connectors at junction between the optical fibers and the sensor head or at a middle of optical fibers for the practical purpose of being able to disassemble the entire instrument. In such a case, it is necessary for the optical fiber multi-connectors to have less than 1 μm precision in their positioning in order to be able to reproduce satisfactory light intensity, but incorporation of such a high precision optical fiber multi-connectors is both impractical from a standpoint of cost and troublesome from a standpoint of ease in handling.

Thirdly, the use of multiple optical fibers such as the projecting optical fiber with the reference optical fiber or the receiving optical fiber with the reference optical fiber makes it easier to receive more influences from the external disturbances.

Also, since the intensity of the reflection beams from the liquid surface is very low, in order to improve the precision of the measurement, it is necessary not only to improve couplings between the receiving optical fiber and the first photo diode as well as between the reference optical fiber and the second photo diode but also to selects the first photo diode and the second photo diode of the equal characteristics. However, there is a limit in an equality of the characteristics between two photo diodes, so that the use of two photo diodes restricted the precision of the measurement.

There are also other applications of a fiber optical displacement sensor such as that in a pressure gauge using a diaphragm in which the displacement of the diaphragm is detected to determine a pressure exerted on the diaphragm. Such a pressure gauge using a fiber optical displacement sensor has an advantage of being free of an influences due to electric noises caused by things such as an electromagnetic induction. But the similar problems given above for the liquid level sensor are also present in such applications.

SUMMARY OF THE INVENTION

It is therefore an object of the present invention to provide a fiber optical displacement sensor having a wider range of measurable distances and displacements.

It is also an object of the present invention to provide a fiber optical displacement sensor capable of stable operations even with the optical fiber multi-connectors incorporated.

It is also an object of the present invention to provide a fiber optical displacement sensor capable of dispensing the use of multiple optical fibers so as to be less sensitive to the external disturbances.

It is also an object of the present invention to provide a fiber optical displacement sensor capable of dispensing the use of more than one photo diode so as to be able to achieve higher precision in measurements.

According to one aspect of the present invention there is provided a fiber optical displacement sensor for measuring displacement of a surface to be measured, comprising: light source means for continuously providing a projection beam to be projected onto the surface to be measured having a certain frequency and a reference beam which carries no information related to the displacement to be measured having another frequency different from that of the projection beam; projecting optical fiber for transmitting the projection beam to a vicinity of the surface to be measured and the reference beam; first photo coupler means between the light source means and the projecting optical fiber for combining the projection beam and the reference beam; receiving optical fiber for transmitting a reflected beam resulting from reflection of the projection beam by the surface to be measured which carries information related to the displacement to be measured and the reference beam; first filter means for separating out the reference beam transmitting through the projecting optical fibers from the projection beam; second photo coupler means between the first filter means and receiving optical fiber for combining the the reference beam separated by the first filter means and the reflected beam; second filter means for separating out the reference beam transmitting through the receiving optical fiber from the reflected beam; beam conversion means for converting the reflected beam and the reference beam into corresponding electrical signals; and means for deriving the displacement to be measured in accordance with the corresponding electrical signals.

Other features and advantages of the present invention will become apparent from the following description taken in conjunction with the accompanying drawings.

BRIEF DESCRIPTION OF THE DRAWINGS

FIG. 21 is a diagram of a liquid level sensor using seventh embodiment of a fiber optical displacement sensor according to the present invention.

FIG. 22(A) and (B) are illustrations for an alternative light source to be used in the liquid level sensor of FIG. 21.

DETAILED DESCRIPTION OF THE PREFERRED EMBODIMENTS

Figure 1:
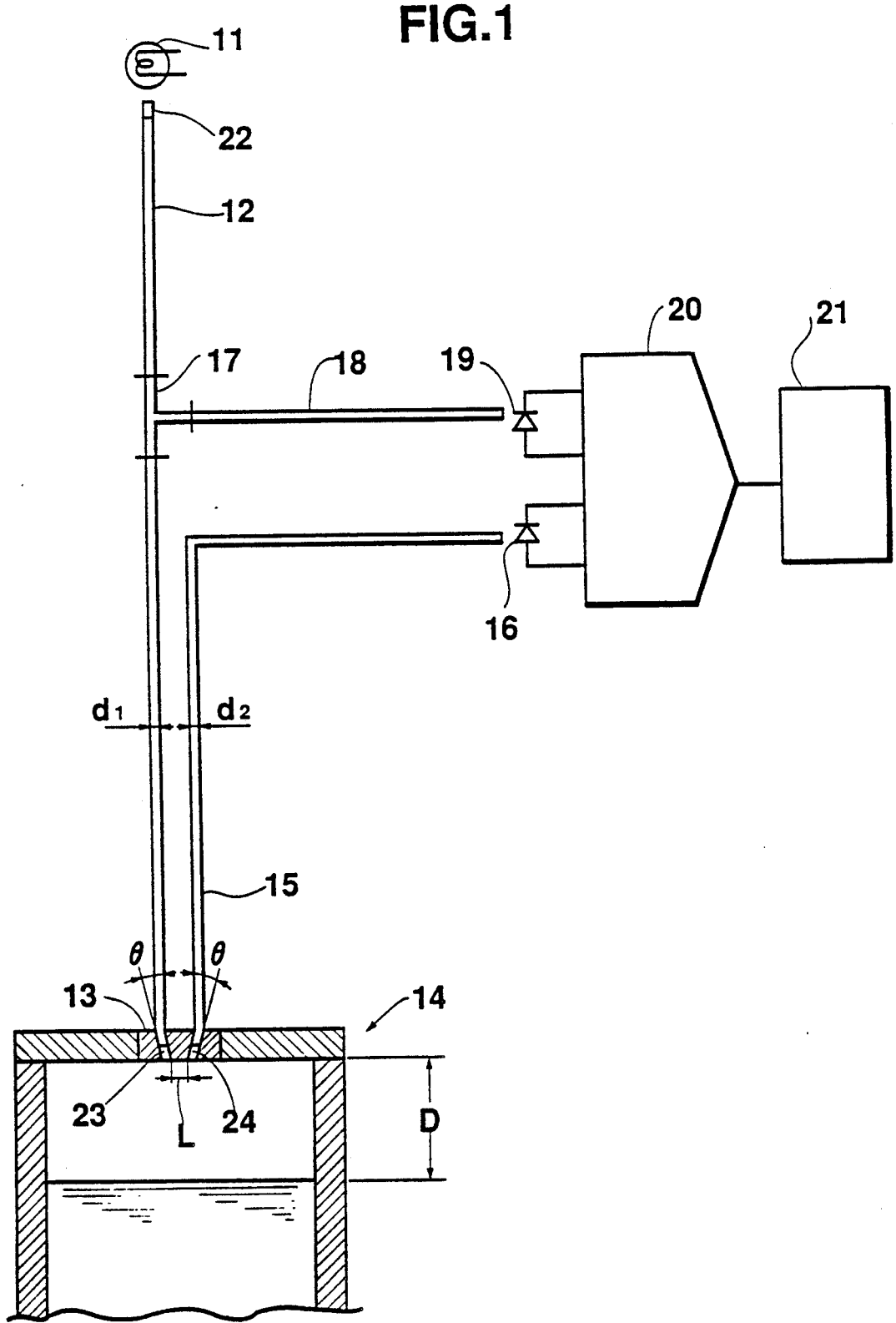
FIG. 1 is a diagram of a liquid level sensor using first embodiment of a fiber optical displacement sensor according to the present invention.

Referring now to FIG. 1, there is shown a liquid level sensor using one embodiment of a fiber optical displacement sensor according to the present invention.

This first embodiment of the liquid level sensor comprises a light source 11 for providing a light beam to be projected, a projecting optical fiber 12 for transmitting the light beam from the light source 11, a sensor head 13 at an end of the projecting optical fiber 12 for projecting the light beam onto a surface of the liquid contained in a container 14 located below the sensor head 13 and for receiving a reflected beam, a receiving optical fiber 15 for transmitting the reflected beam from the sensor head 13, a first photo diode 16 at an end of the receiving optical fiber 15 for receiving the reflected beam, a photo coupler 17 for taking a part of the light beam transmitting through the projecting optical fiber 12, a reference optical fiber 18 for transmitting the part of the light beam taken out by the photo coupler 17 as a reference beam, a second photo diode 19 at an end of the reference optical fiber 18 for receiving the reference beam, an operational circuit 20 for arithmetically operating on signals from the first and second photo diodes 16 and 19 to adjust effects such as light intensity fluctuation due to external disturbances, and an output adjusting circuit 21 for deriving a correspondence between a signal from the operational circuit 20 and a liquid level to obtain an accurate measurement result.

The projecting optical fiber 12 is equipped with a condenser lense 22 and a collimator 23 at both ends, and the receiving optical fiber 15 is also equipped with a collimator lens 24 at an end in the sensor head 13. These lenses 23 and 24 prevent the decrease of light intensity due to divergence of the light beam and stabilize the optical axes of the projecting and receiving optical fibers 12 and 15. The effect of this feature will be explained in further detail below.

Furthermore, the projecting optical fiber 12 and the receiving optical fiber 15 are angled inside the sensor head 13 so as to point to the liquid surface at an angle $\theta$, and are a distance L apart from each other. This configuration contributes to obtain stronger reflection beam. Moreover, the projecting optical fiber 12 and the receiving optical fiber 15 are to be installed together in a single cable, so that they will vibrate together under an external vibration.

The light source 11 is, for instance, an LED which is more durable or a halogen lamp which is more powerful.

The operational circuit 20 adjusts the signals from the first and second photo diodes 16 and 19 to remove effects such as light intensity fluctuation due to external distrubances by dividing the signal from the first photo diode 16 by that from the second photo diode 19.

The output adjusting circuit 21 derives a correspondence between a signal from the operational circuit 20 and a liquid level to obtain an accurate measurement result as follows. In general, the amount of reflection to be received by the receiving optical fiber 15 is inversely proportional to the distance $D^2$ from the sensor head 13 to the liquid surface. Furthermore, in the configuration described above, the amount of reflection to be received by the receiving optical fiber 15 also depends on the distance L separating the ends of the projecting and receiving optical fibers 12 and 15 in the sensor head 13, the angle $\theta$ of the ends of the projecting and receiving optical fibers 12 and 15 in the sensor head 13, and optical fiber core diameters $d_1$ and $d_2$ of the projecting and receiving optical fibers 12 and 15, respectively. Thus, by taking these parameters into account, the level of the liquid can be determined.

As an example, for a configuration of optical fibers of NA (numerical aperture)=0.08 and optical fiber core diameters $d_1=d_2=0.2$ mm, with the angle $\theta=1°$ and the distance L=3 mm, the relationship between the distance D and the output V of the operational circuit 20 is given by:

$$D = 170 V^{-0.5}$$

Figure 2:
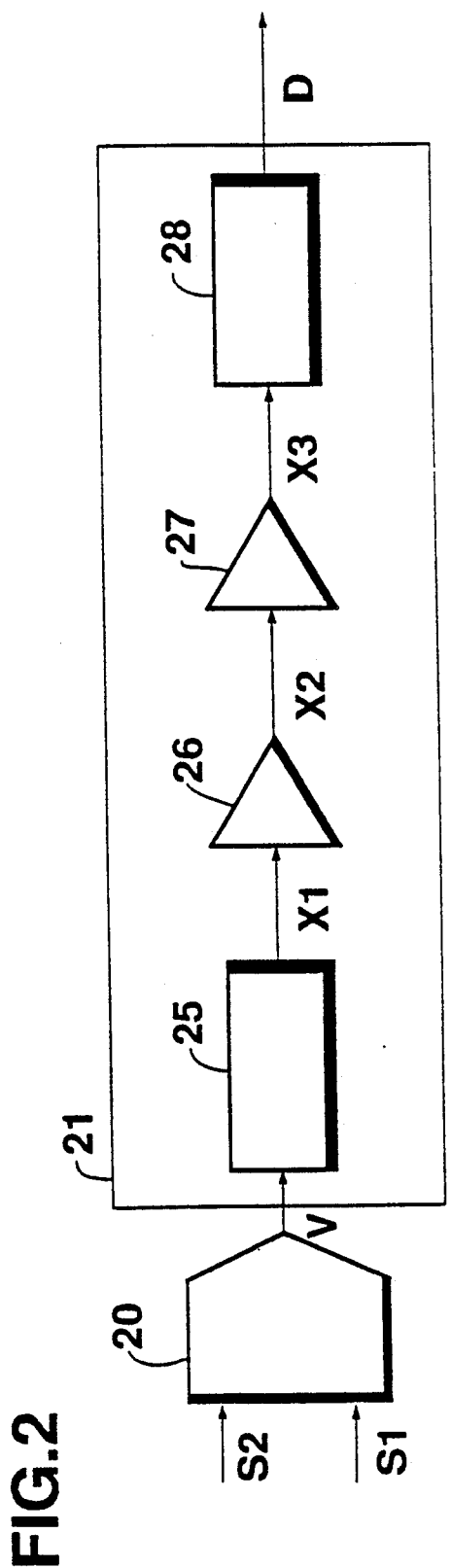
FIG. 2 is a block diagram of an output adjusting circuit of the liquid level sensor of FIG. 1.

In this case, the detail of the output adjusting circuit 21 is shown in FIG. 2, where it comprises a series of a log circuit 25 for taking logarithm of base 10, a multiplier 26, a subtractor 27, and an exp circuit 28 for exponentiating as power of 10. More specifically, for the above configuration, after the operational circuit 20 obtains V as a signal S1 from the first photo diode 16 divided by a signal S2 from the second photo diode 19, the log circuit 25 calculates a quantity $X1 = -K\log(V/E)$ with K=1 and E=0.1. Then the multiplier 26 multiplies this quantity X1 by $-0.5$ to obtain a quantity X2. Then the subtractor 27 subtracts $-1.7$ from this quantity X2 to obtain a quantity X3. Then the exp circuit 28 calculates a quantity $D = E10^{-X3/K} \times 100$ mm with K=1 and E=0.1 again. Thus, for example when V=0.1 v, X1 will be 0, so X2 will also be 0, and so X3 will be $-1.7$, and finally D will be 550 mm. Similarly, when V=10 v, X1 will be $-2$, so X2 will also be 1.0, and so X3 will be $-0.7$, and finally D will be 50 mm. The value for D thus obtained may be displayed or utilized in further processing.

Figure 3:
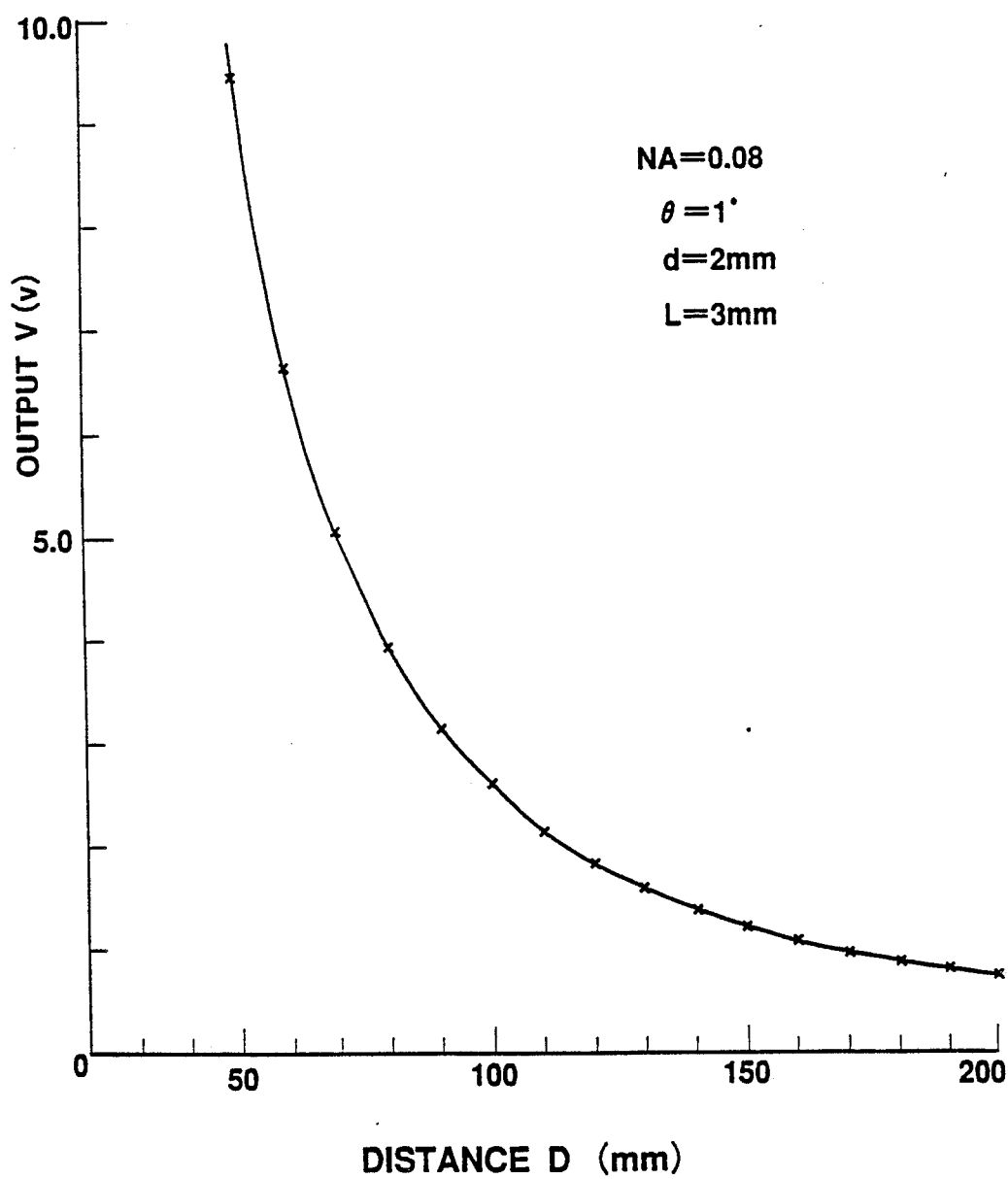
FIG. 3 is a graph of output of an operational circuit of the liquid level sensor of FIG. 1 versus a distance to the liquid surface to be measured.
Figure 4:
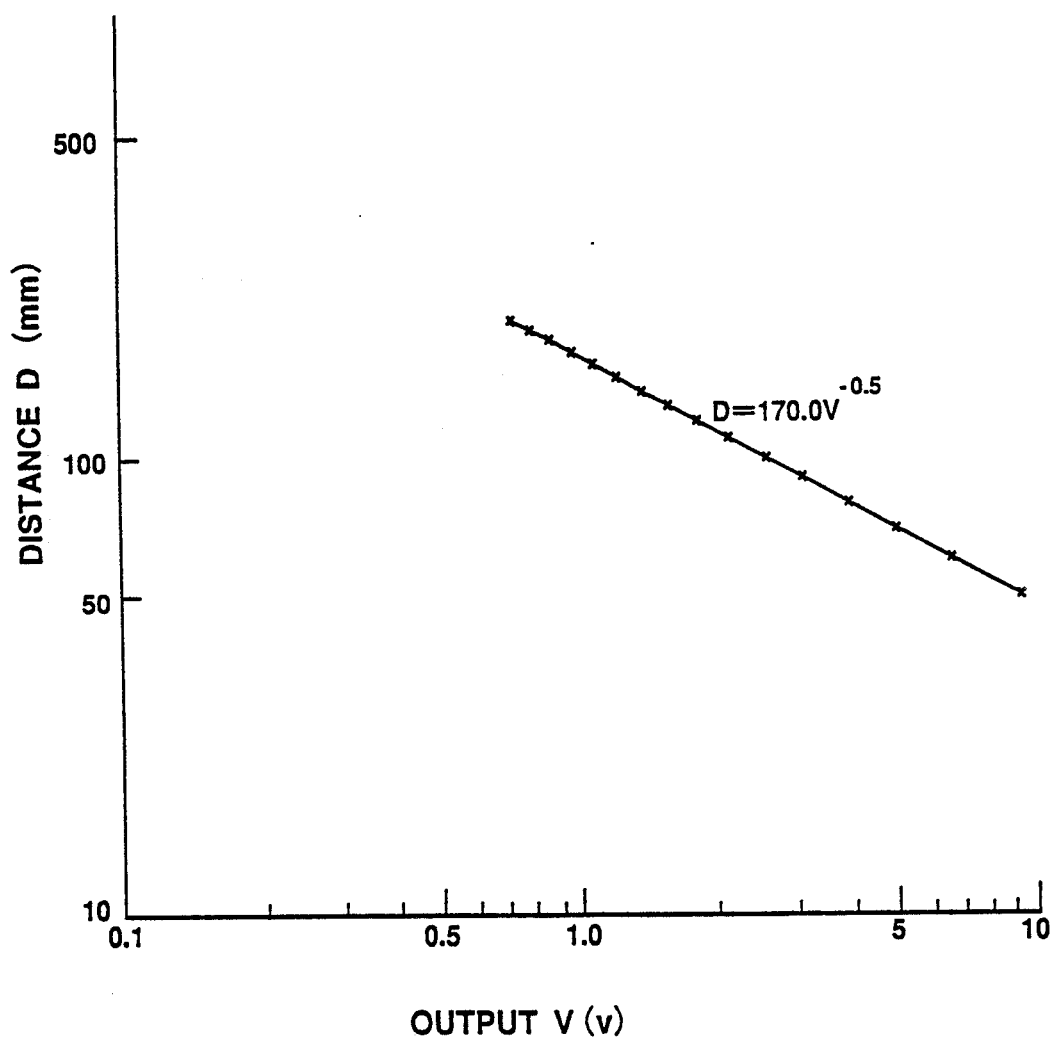
FIG. 4 is a graph of output of an operational circuit of the liquid level sensor of FIG. 1 versus a distance to the liquid surface to be measured on logarithmic scale.

This transforms the actual relationship between the output V of the operational circuit 20 and the distance D shown in FIG. 3 obtained by direct measurement into a linear relationship shown in FIG. 4.

Now, the value of NA can be variously chosen by selecting the combination of optical fibers and lenses. On the other hand, this value of NA, the angle $\theta$, and the distance L determine the range of distance D that can be measured effectively. The relationship among these parameters has been investigated as follows.

Figure 5:
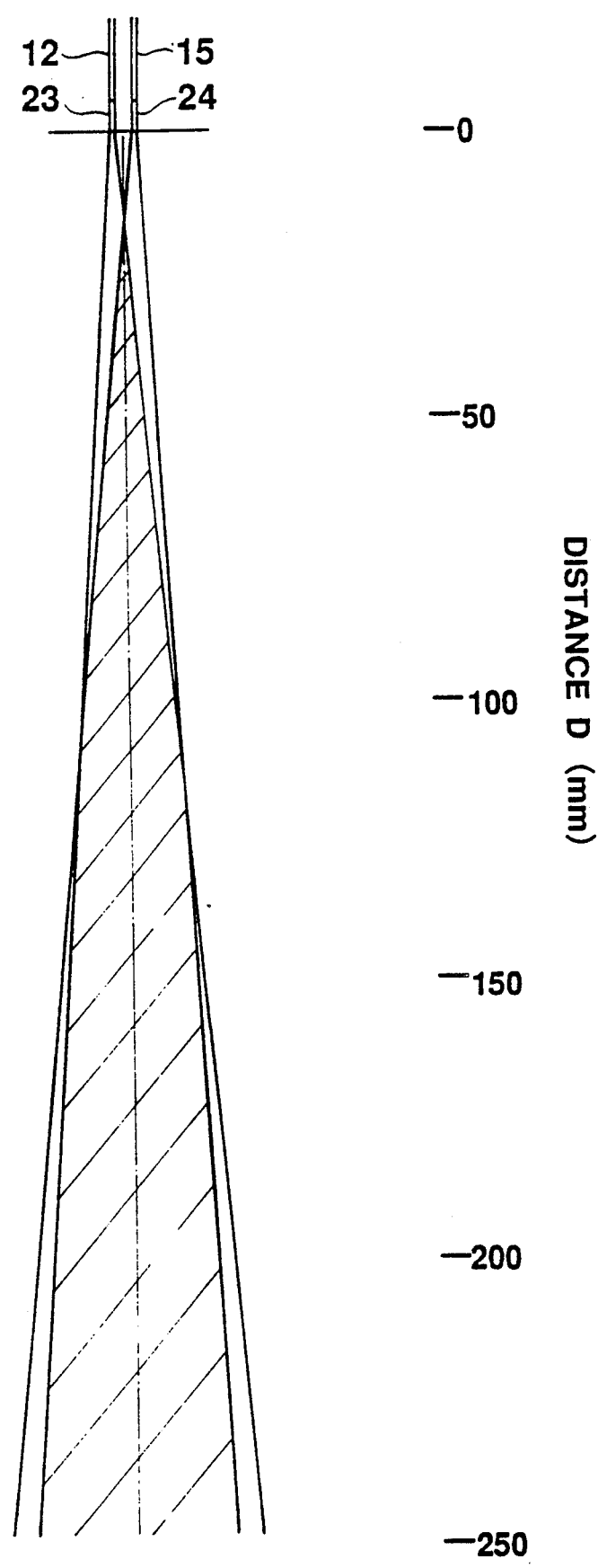
FIG. 5 is a diagram showing scopes of a projecting and receiving optical fibers of the liquid sensor of FIG. 1 with indication of measurable region for a particular combination of parameters.
Figure 6:
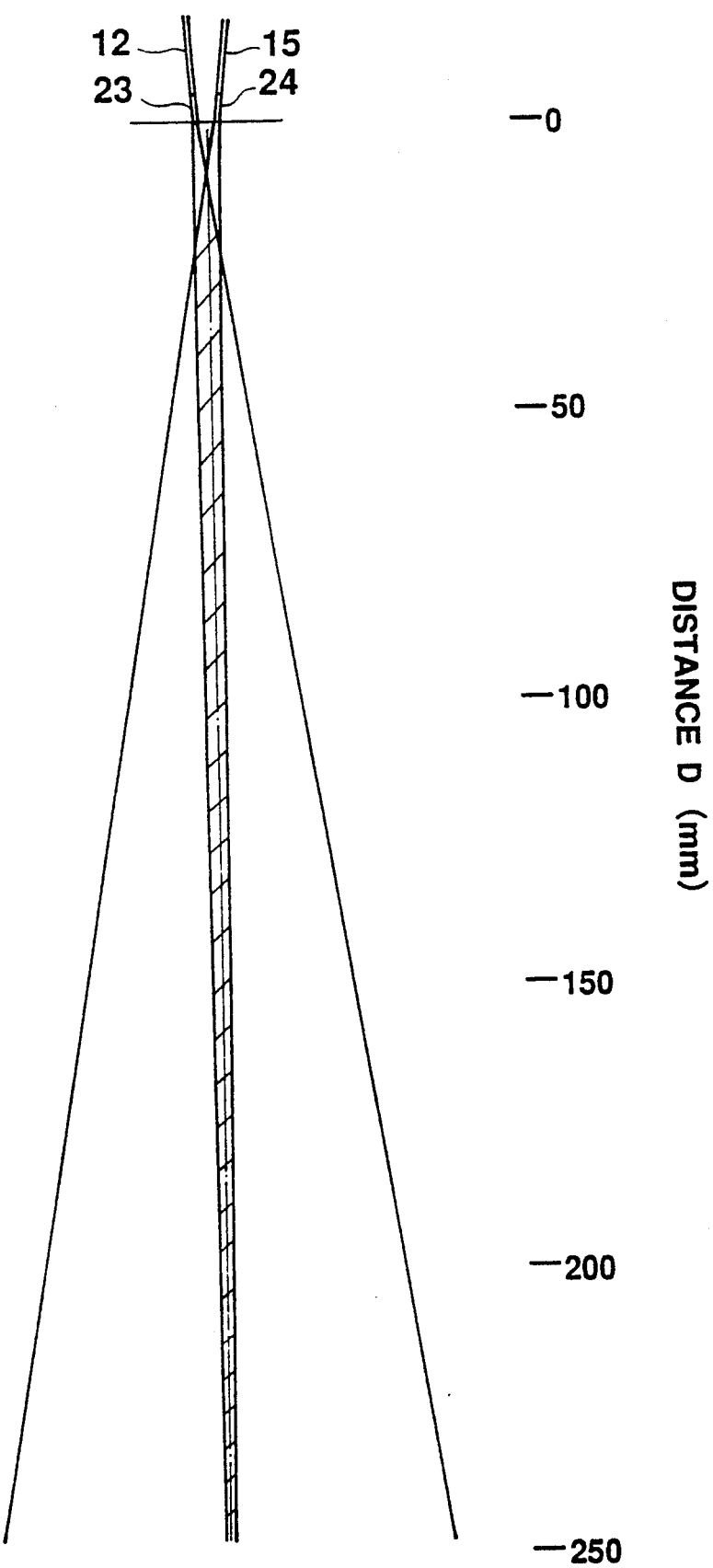
FIG. 6 is a diagram showing scopes of the projecting and receiving optical fibers of the liquid sensor of FIG. 1 with indication of measurable region for another particular combination of parameters.
Figure 7:
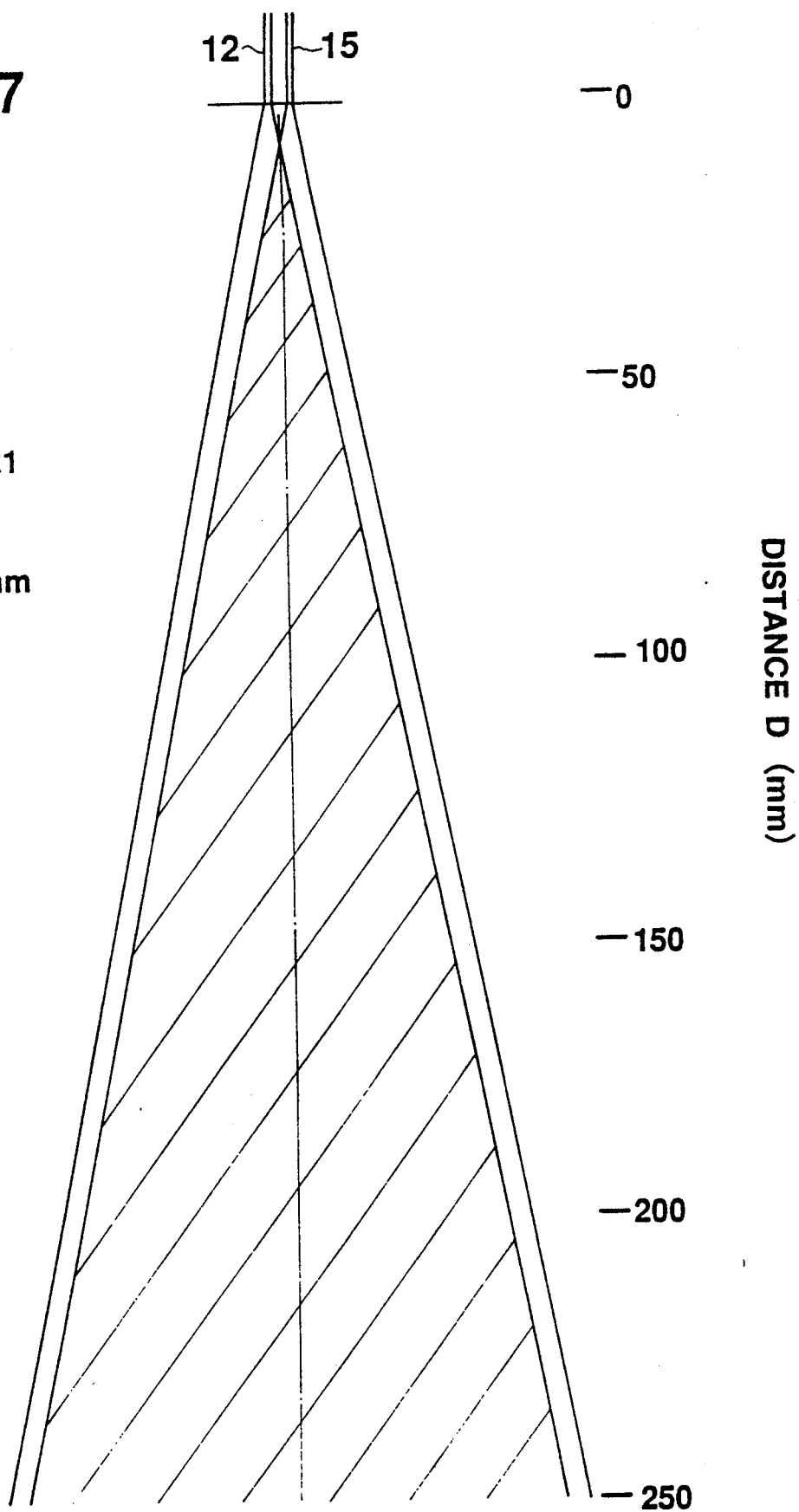
FIG. 7 is a diagram showing scopes of the projecting and receiving optical fibers of the liquid sensor of FIG. 1 with indication of measurable region for another particular combination of parameters.
Figure 8:
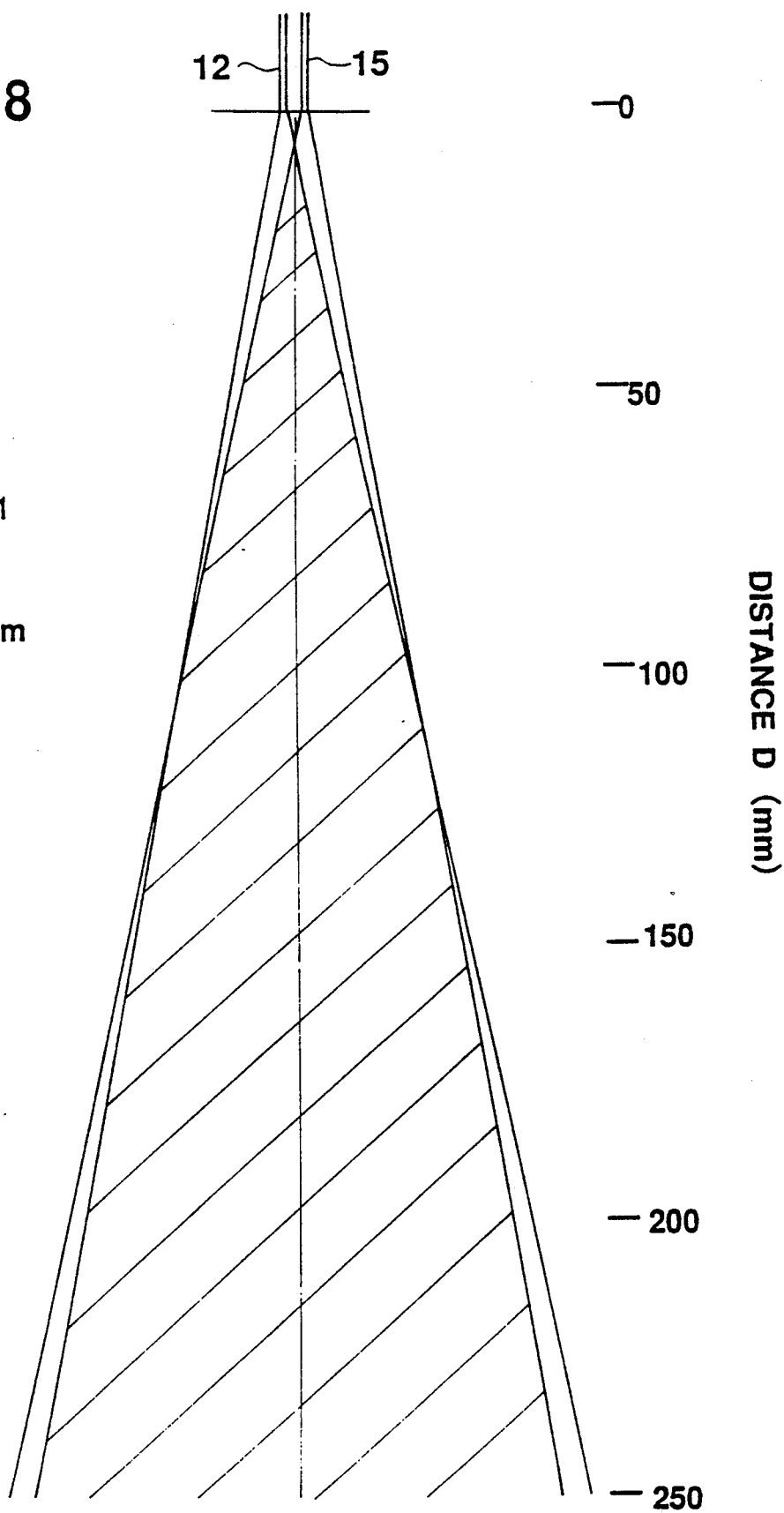
FIG. 8 is a diagram showing scopes of the projecting and receiving optical fibers of the liquid sensor of FIG. 1 with indication of measurable region for another particular combination of parameters.
Figure 9:
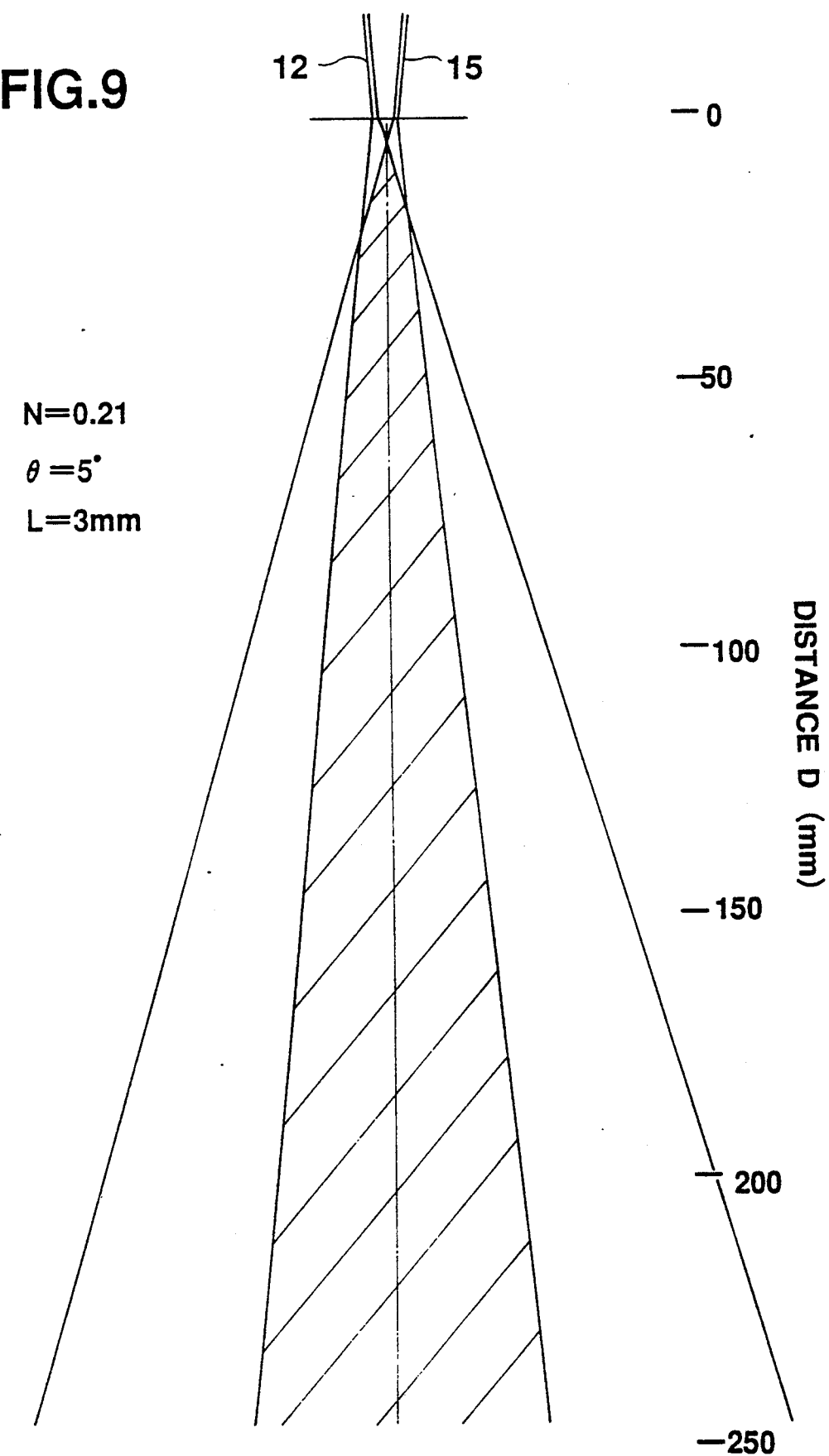
FIG. 9 is a diagram showing scopes of the projecting and receiving optical fibers of the liquid sensor of FIG. 1 with indicaon of measurable region for another particular combination of parameters.
Figure 10:
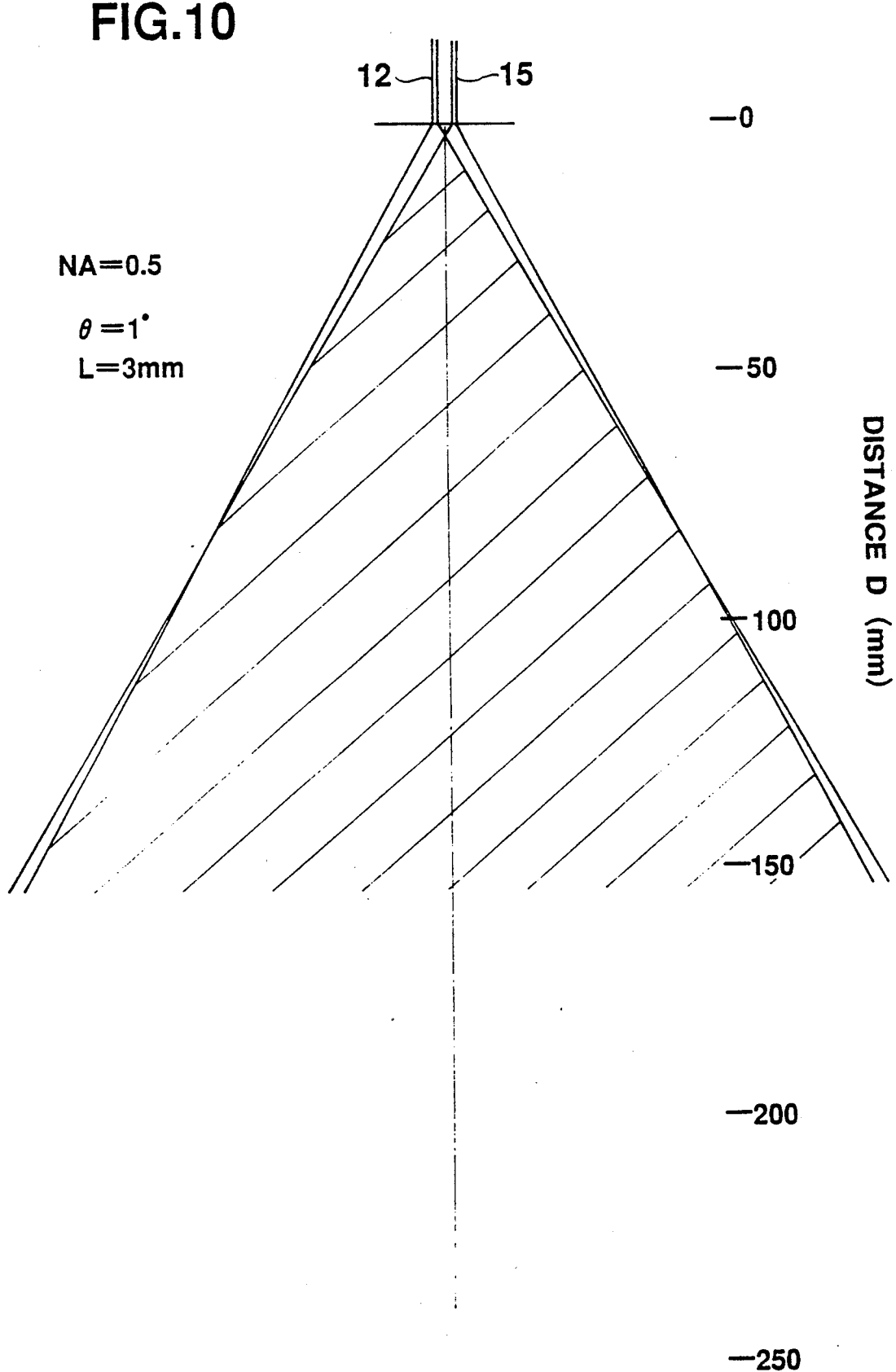
FIG. 10 is a diagram showing scopes of the projecting and receiving optical fibers of the liquid sensor of FIG. 1 with indication of measurable region for another particular combination of parameters.

FIGS. 5 to 10 show scopes of the projecting and receiving optical fibers 12 and 15 in which the measurable region determined by them is indicated as shaded area for various combination of the value of NA, the angle $\theta$, and the distance L. Namely, FIG. 5 shows the case in which NA=0.08, L=3.0 mm, and $\theta=1°$, FIG. 6 shows the case in which NA=0.08, L=3.0 mm, and $\theta=5°$, FIG. 7 shows the case in which NA=0.21, L=3.0 mm, and $\theta=0°$, FIG. 8 shows the case in which NA=0.21, L=3.0 mm, and $\theta=1°$, FIG. 9 shows the case in which NA=0.21, L=3.0 mm, and $\theta=5°$, and FIG. 10 shows the case in which NA=0.5, L=3.0 mm, and $\theta=1°$.

Figure 11:
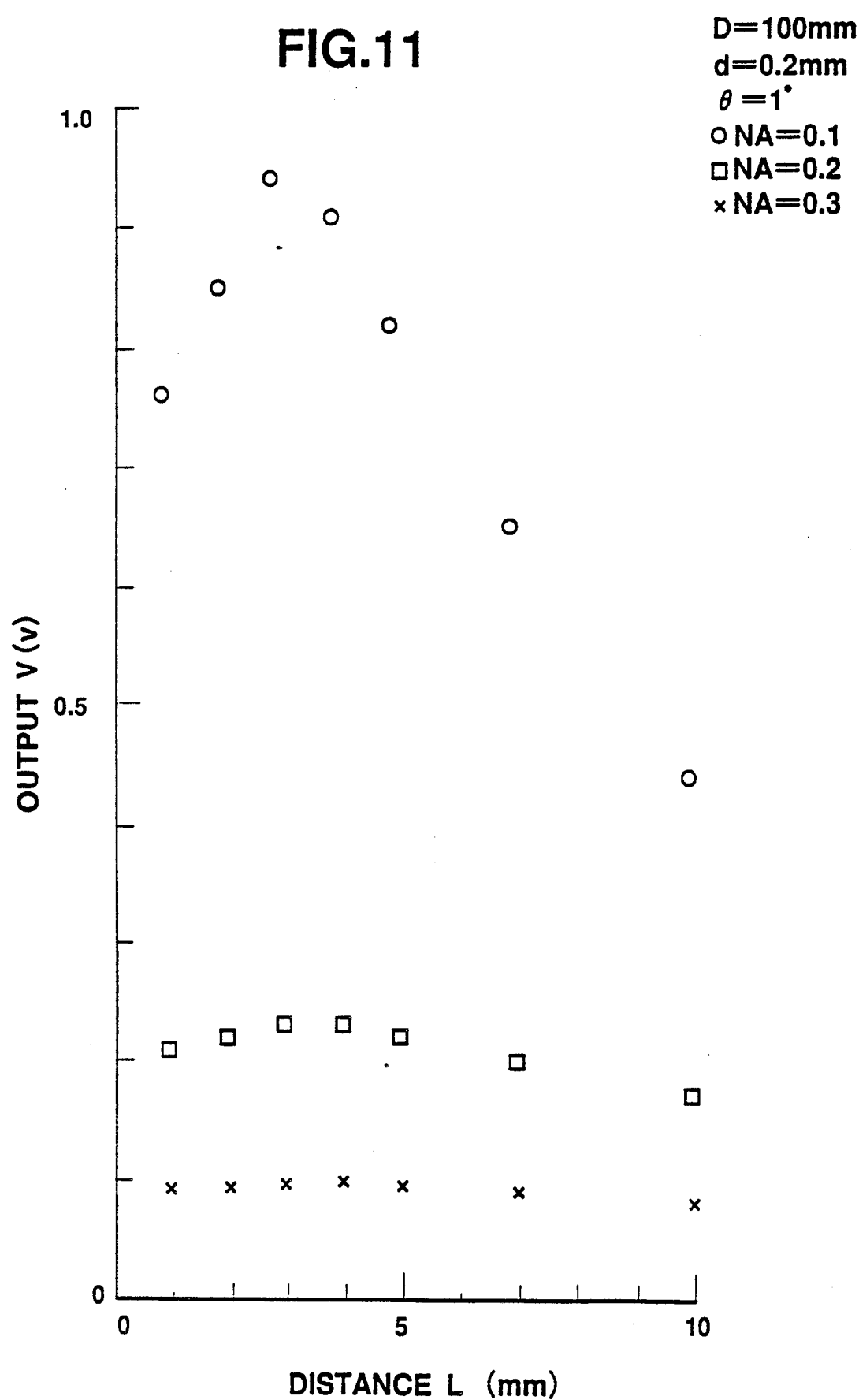
FIG. 11 is a graph showing relationships between output of the operational circuit and optical fiber core diameters, NA, an angle, and separating distance of the projecting and receiving optical fibers.
Figure 12:
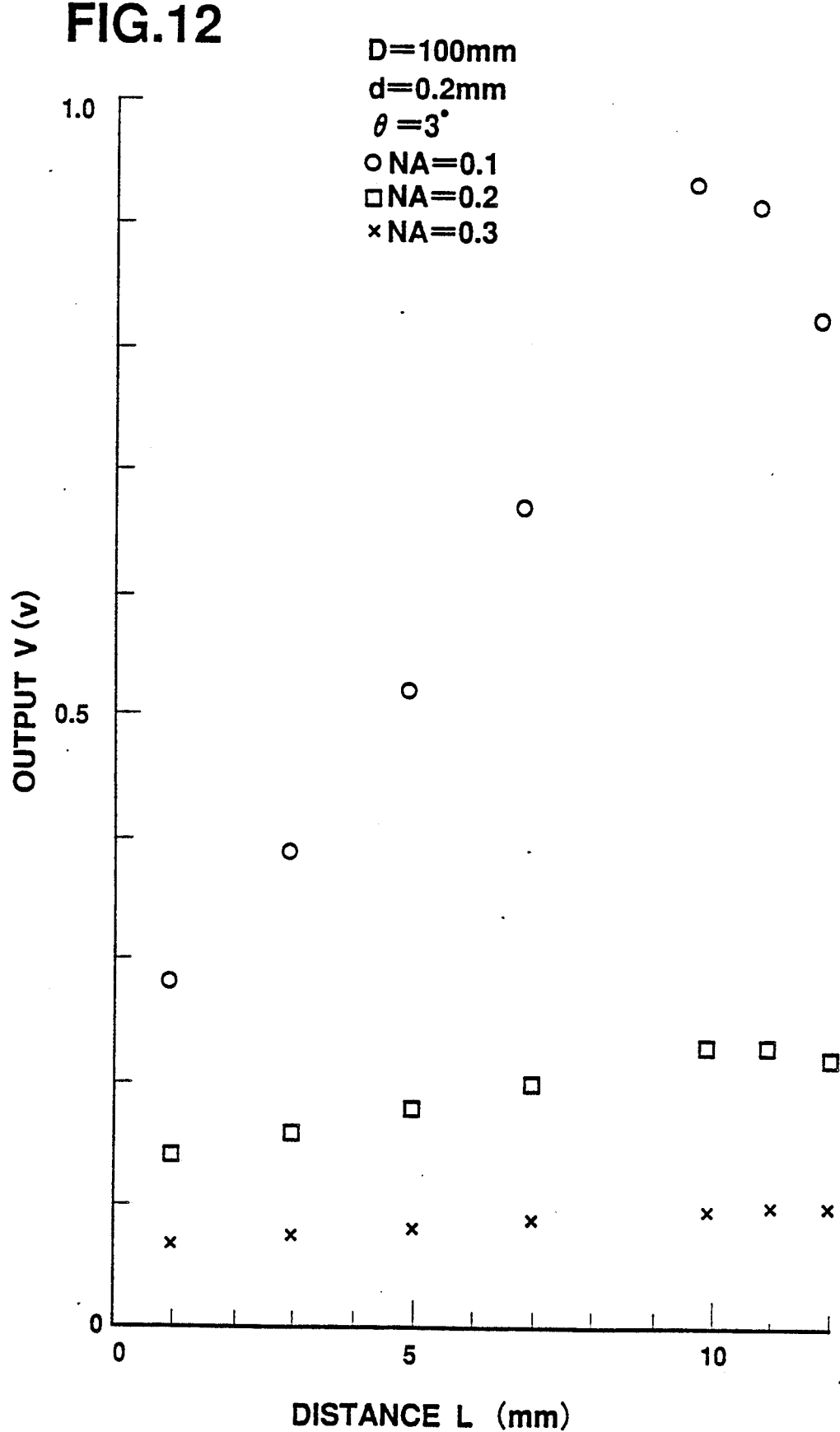
FIG. 12 is another graph showing relationships between output of the operational circuit and optical fiber core diameters, NA, an angle, and separating distance of the projecting and receiving optical fibers.
Figure 13:
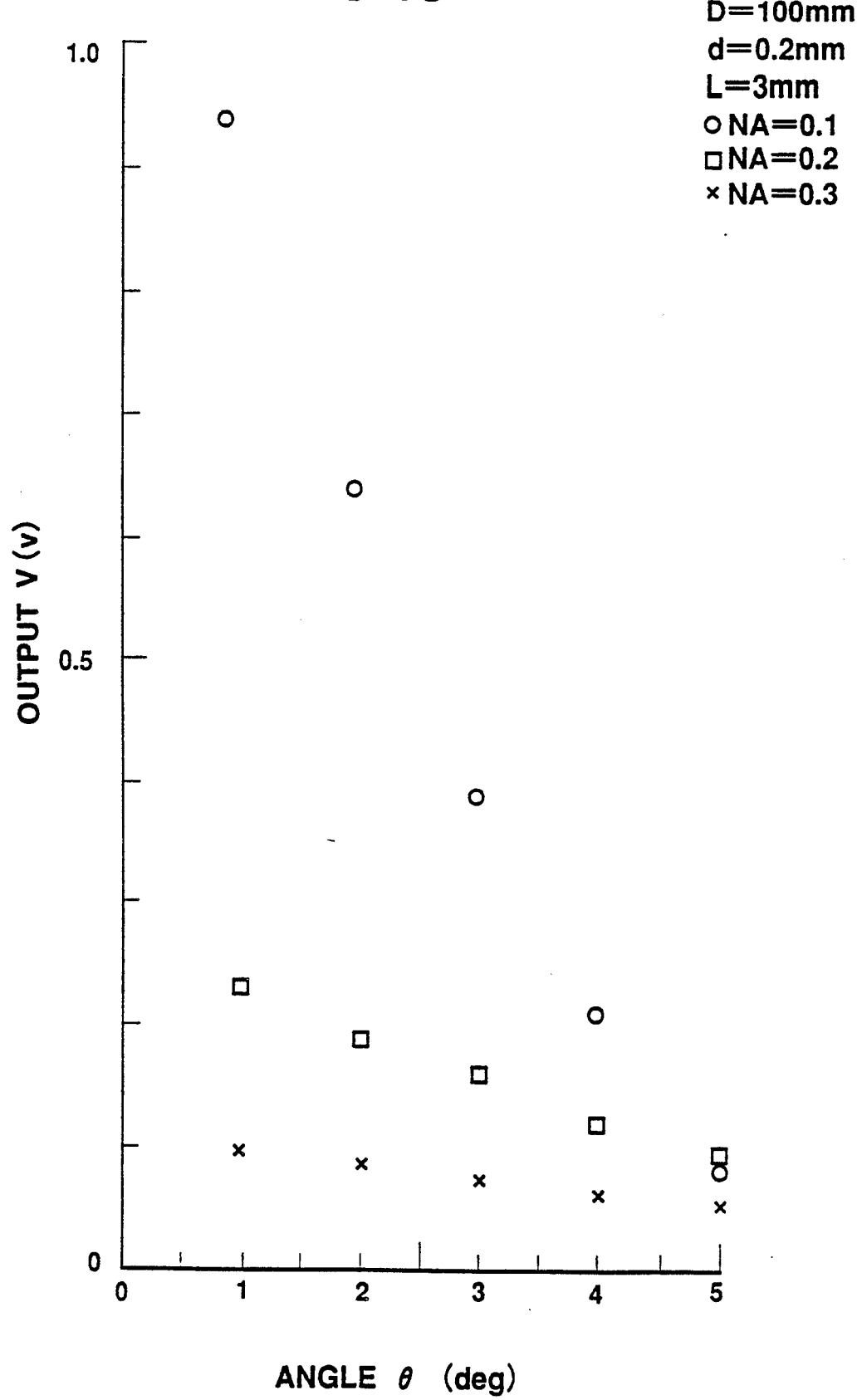
FIG. 13 is another graph showing relationships between output of the operational circuit and optical fiber core diameters, NA, an angle, and separating distance of the projecting and receiving optical fibers.
Figure 14:
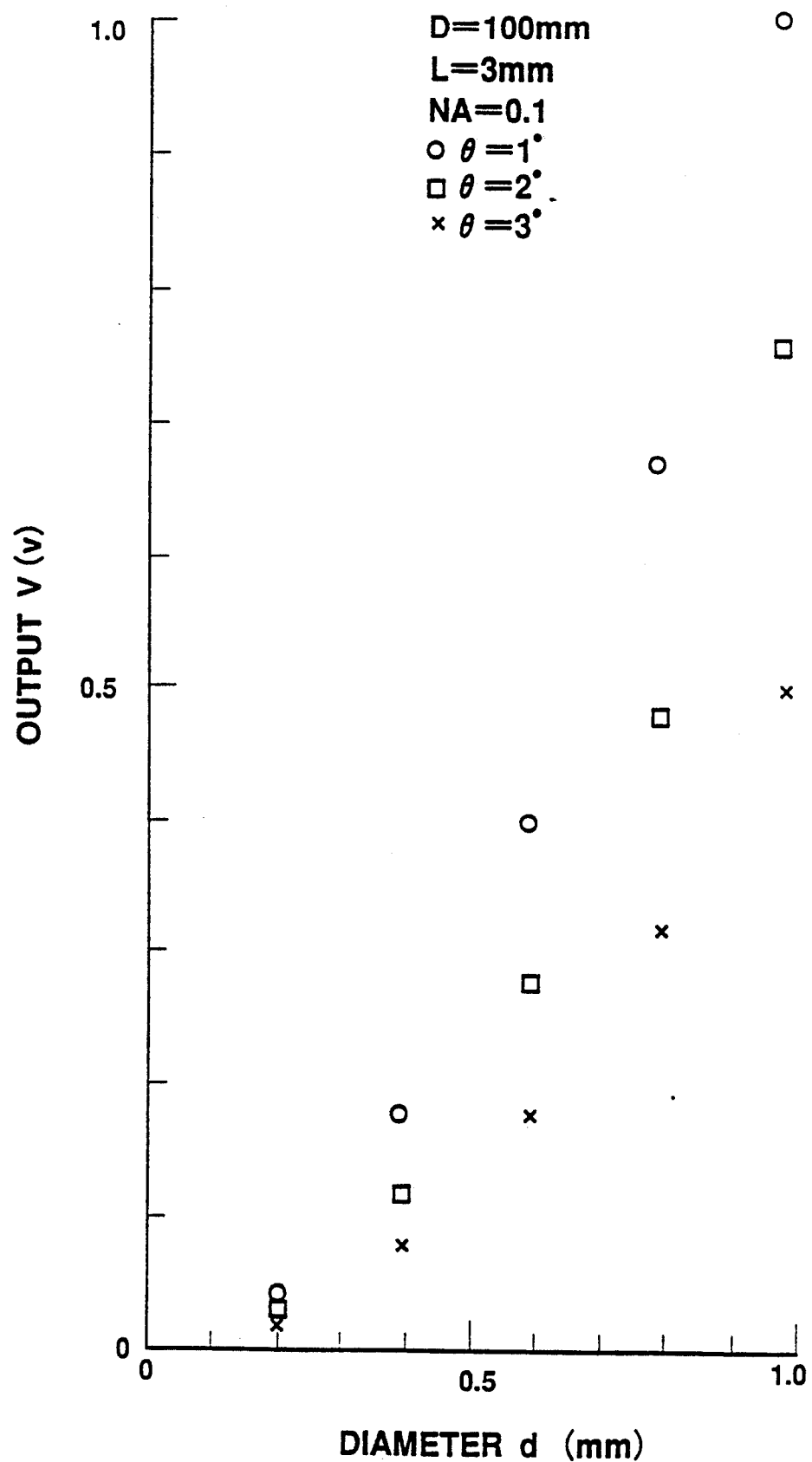
FIG. 14 is another graph showing relationships between output of the operational circuit and optical fiber core diameters, NA, an angle, and separating distance of the projecting and receiving optical fibers.

FIGS. 11 to 14 further show the relation between the level of the output V of the operational circuit 20 and two of the optical fiber core diameter $d=d_1=d_2$ of the projecting and receiving optical fibers 12 and 15, value of NA, the angle $\theta$, and the distance L, while the remaining two of these and the distance D are fixed. Namely, FIG. 11 shows the case in which D=100 mm, d=0.2 mm, $\theta=1°$ for NA=0.1, 0.2 and 0.3 with various value of L, FIG. 12 shows the case in which D=100 mm, d=0.2 mm, $\theta=3°$ for NA=0.1, 0.2 and 0.3 with various value of L, FIG. 13 shows the case in which D=100 mm, d=0.2 mm, L=3 mm for NA=0.1, 0.2 and 0.3 with various value of $\theta$, and FIG. 14 shows the case in which D=100 mm, L=3 mm, NA=0.1 for $\theta=1°$, 2° and 3° with various value of d.

From these observations, it follows that in order to have a reasonable width of the measurable region and a reasonably collimated beam at a same time, the value of NA is preferably in a range of $0 < NA \leq 0.5$, and the angle $\theta$ is preferably in a range of $0° \leq \theta \leq 5°$. Furthermore, it is more desirable to have $NA \approx 0.1$, $0° < \theta \leq 1°$, and $1 \text{ mm} \leq L \leq 5$ mm.

It is to be noted that, as mentioned above, the value of NA can be variously chosen by selecting the combination of optical fibers and lenses. This includes, in particular, the selecting of optical fibers of smaller NA and no lens.

Now, various other embodiments of the liquid level sensor using a fiber optical displacement sensor according to the present invention will be described. In the following description, those parts which are equivalent to the corresponding parts in the first embodiment above will be given the same labels in the drawings, and their explanation will generally be omitted.

Figure 15:
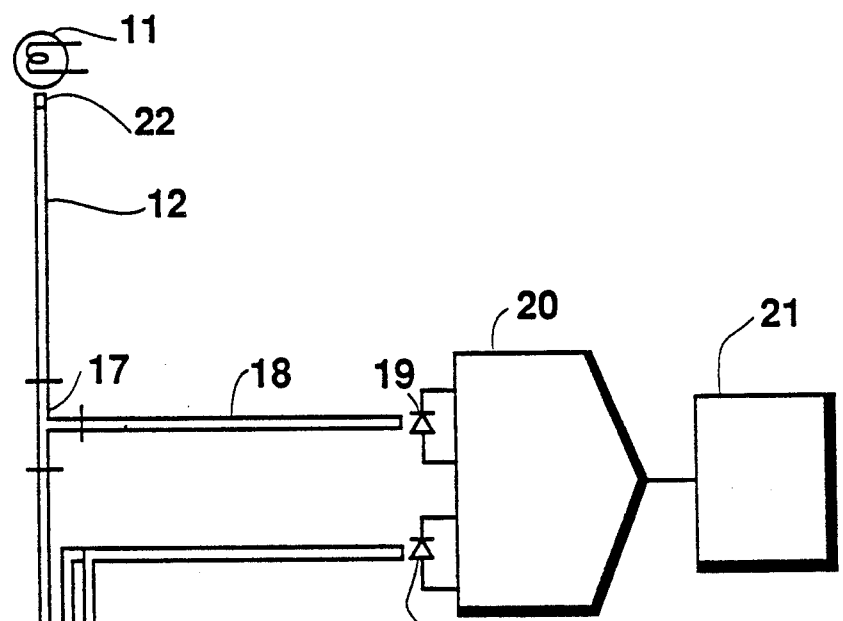
FIGS. 15(A) and (B) are diagram and illustration of a liquid level sensor using second embodiment of a fiber optical displacement sensor according to the present invention.
Figure 15:
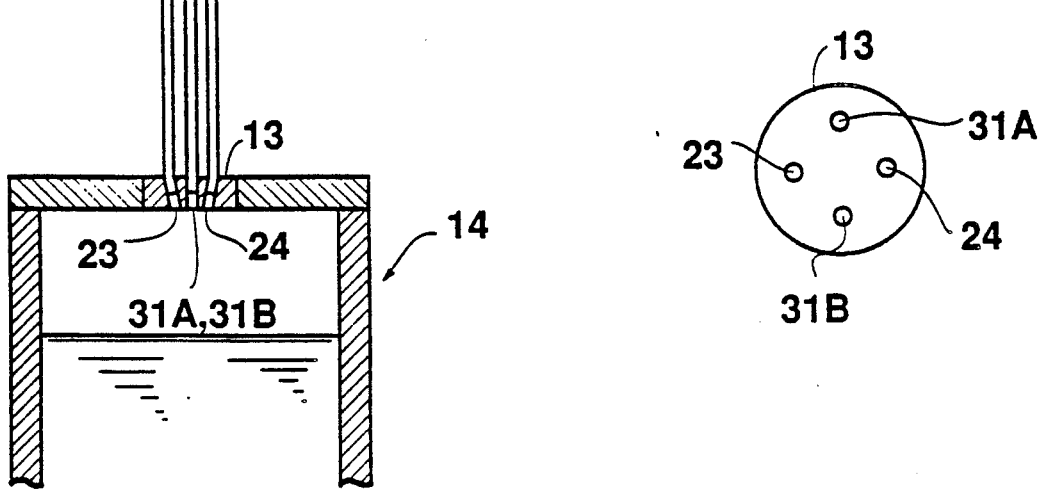

Referring now to FIGS. 15(A) and 16(B), there is shown another liquid level sensor using another embodiment of a fiber optical displacement sensor according to the present invention.

In this second embodiment, the liquid level sensor of the previous first embodiment is further equipped with additional receiving optical fibers 30A and 30B along a direction perpendicular to that joining the projecting and receiving optical fibers 12 and 15. Both of the additional receiving optical fibers 30A and 30B are equipped with lenses 31A and 31B, respectively, inside the sensor head 13. The reflected beam received by all of the receiving optical fibers 15, 30A, and 30B are transmitted to the first photo diode 16. As a consequence, the amount of reflected beam to be received can be increased, so that more accurate measurement is possible.

Figure 16:
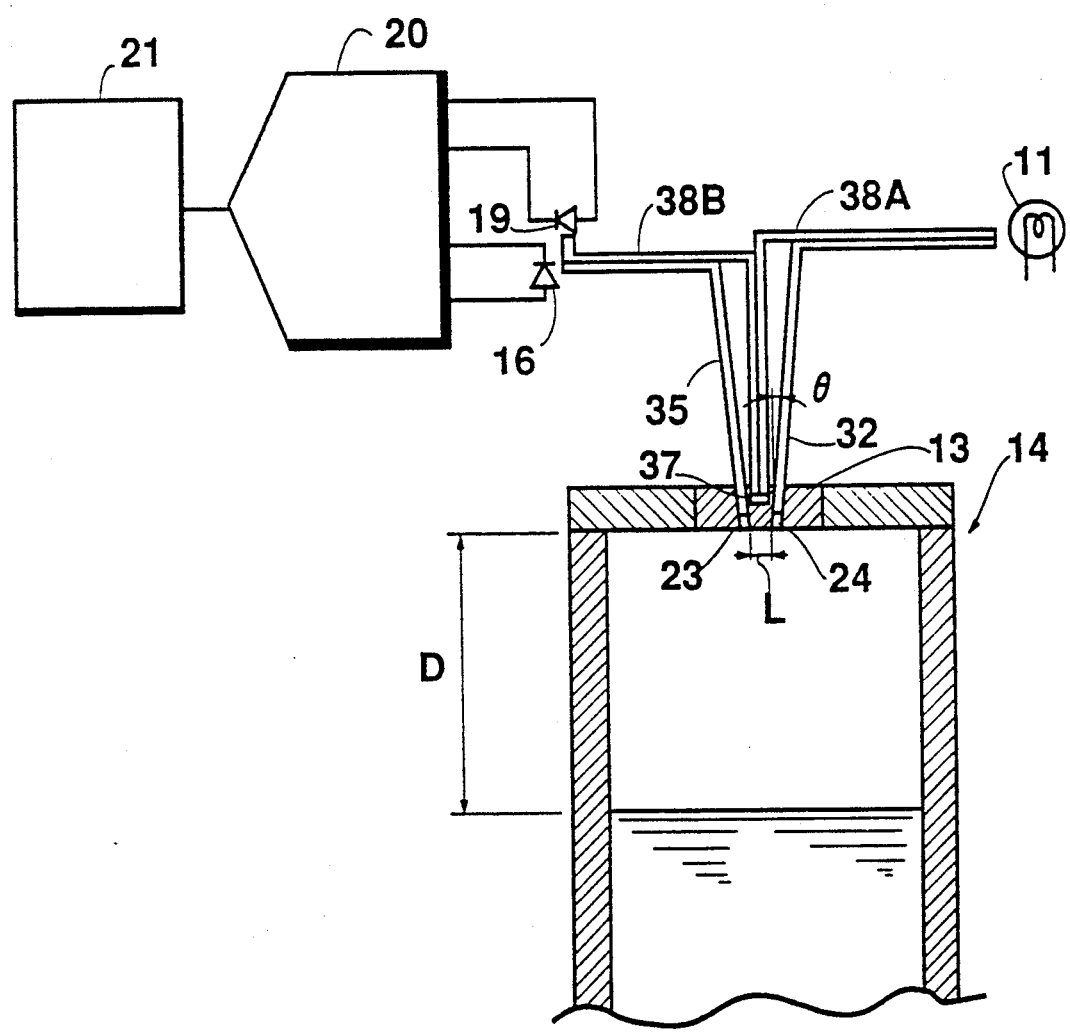
FIG. 16 is a diagram of a liquid level sensor using third embodiment of a fiber optical displacement sensor according to the present invention.

Referring now to FIG. 16, there is shown another liquid level sensor using another embodiment of a fiber optical displacement sensor according to the present invention.

In this third embodiment, the projecting, receiving, and reference optical fibers 12, 15, and 18 in the first embodiment are replaced by a projecting optical fiber 32, a receiving optical fiber 35, and reference optical fibers 38A and 38B, which are characterized in that the projecting optical fiber 32 and the receiving optical fiber 35 are arranged to be parallel with the reference optical fibers 38A and 38B both in vertical and horizontal directions, as much as possible, in such a manner that they are substantially unified together. The reference optical fibers 38A and 38B are coupled through a cavity 37 located inside the sensor head 13. With this configuration, all of the projecting optical fiber 32, the receiving optical fiber 35, and the reference optical fibers 38A and 38B will vibrate together both in vertical and horizontal directions under external vibrations, so that the stability with respect to the external influence is further improved.

Figure 17:
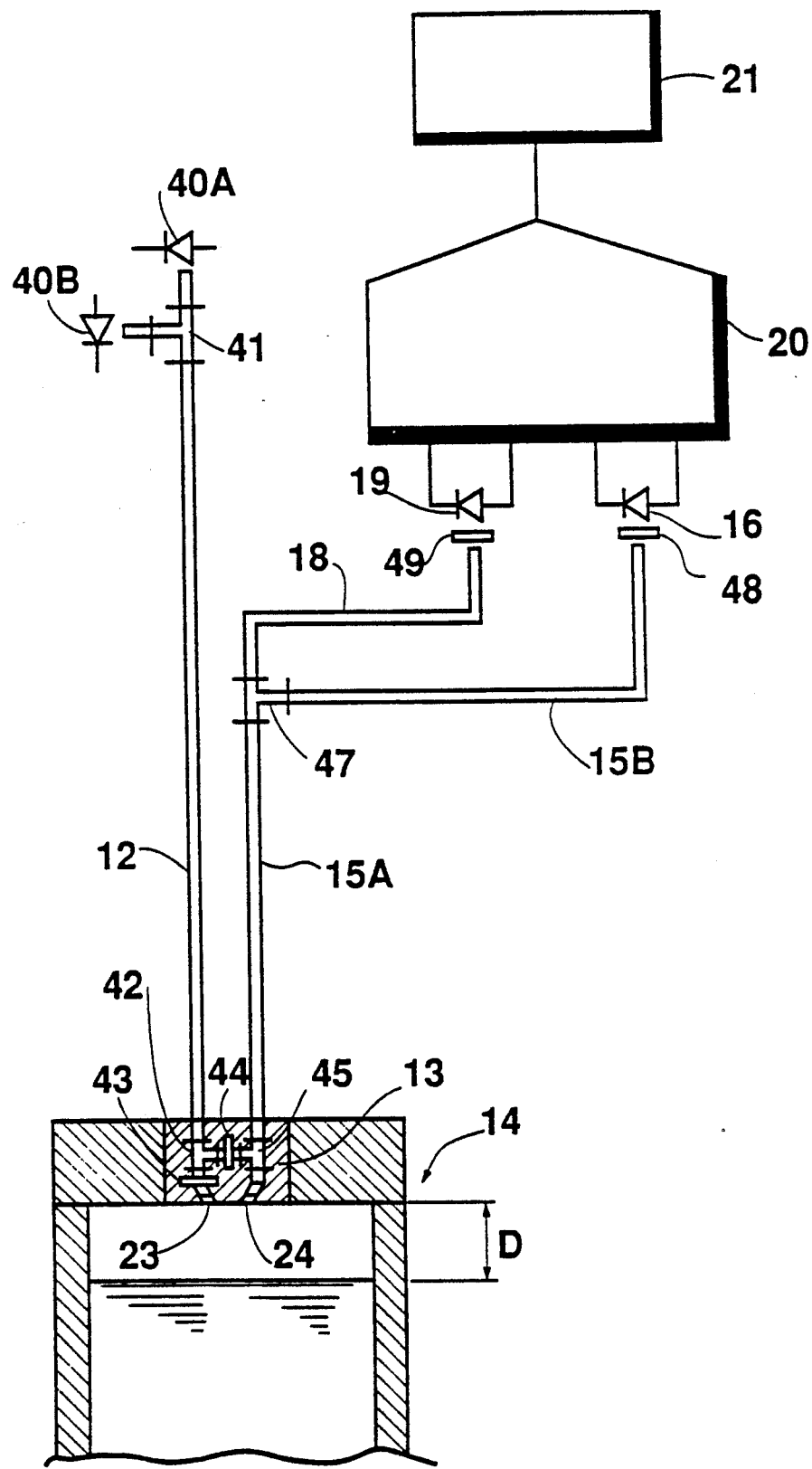
FIG. 17 is a diagram of a liquid level sensor using fourth embodiment of a fiber optical displacement sensor according to the present invention.

Referring now to FIG. 17, there is shown another liquid level sensor using another embodiment of a fiber optical displacement sensor according to the present invention.

In this fourth embodiment, there are a first LED 40A for providing a projection beam to be projected onto the liquid surface, and a second LED 40B for providing a reference beam of different wavelength than the projection beam, which are combined together by a first photo coupler 41 and are transmitted through the projecting optical fiber 12 as a first combined beam. Then, in the sensor head 13, this first combined beam is divided into two by a second photo coupler 42. One of the divided beam is transmitted through a first interference filter 43 to remove the reference beam component from the first combined beam, and the projection beam emerging from the first interference filter 43 are projected onto the surface of the liquid inside the container 14 through the lens 23. Meanwhile, another one of the divided beam from the second photo coupler 42 is transmitted through a second interference filter 44 to remove the projection beam component from the first combined beam, and the reference beam emerging from the second interference filter 44 are transmitted to a third photo coupler 45. On the other hand, the reflected beam from the liquid surface is received by the receiving optical fiber 15A through the lens 24, and combined with the reference beam from the second interference filter 44 by the third photo coupler 45 as a second combined beam. This second combined beam is then transmitted through the receiving optical fiber 15A, and divided into two by a fourth photo coupler 47. One of the divided beam is further transmitted through another receiving optical fiber 15B to the first photo diode 16 through a third interference filter 48 which removes the reference beam component from the second combined beam, while another one of the divided beam is transmitted through the reference optical fiber 18 to the second photo diode 19 through a fourth interference filter 49 which removes the reflected beam component from the second combined beam. The signal from the first and second photo diodes 16 and 19 are then processed by the operational circuit 20 and the output adjusting circuit 21 as in the first embodiment.

Moreover, in this fourth embodiment, because the projection beam component and the reference beam component are separated by means of the first and second interference filters 43 and 44, the first LED 40A and the second LED 40B can continuously emit the projection beam and the reference beam. As a result, the processing at the operational circuit 20 and the output adjusting circuit 21 can also be performed continuously, and consequently the displacement measurement can be performed continuously without any interruption.

Thus, in this fourth embodiment, the use of multiple optical fibers in the previous embodiments has been dispensed by the use of photo couplers, interference filters, and combined beams. This feature not only makes this fourth embodiment less sensitive to the external disturbances, but also make it less important to have extremely high precision in the optical fiber multi-connectors that can be incorporated for the practical purpose of being able to disassemble, because the reference beam is transmitted with the projection beam or the reflected beam in one and the same optical fiber.

It is to be noted that the interference filters used in this embodiment can be replaced by other types of device for separating beams of different wavelengths, such as polarization beam splitter, and the light source of the first and the second LED 40A and 40B combined by the first photo coupler 41 may be replaced by the other types of light source capable of emitting beams of two different wavelengths continuously.

Figure 18:
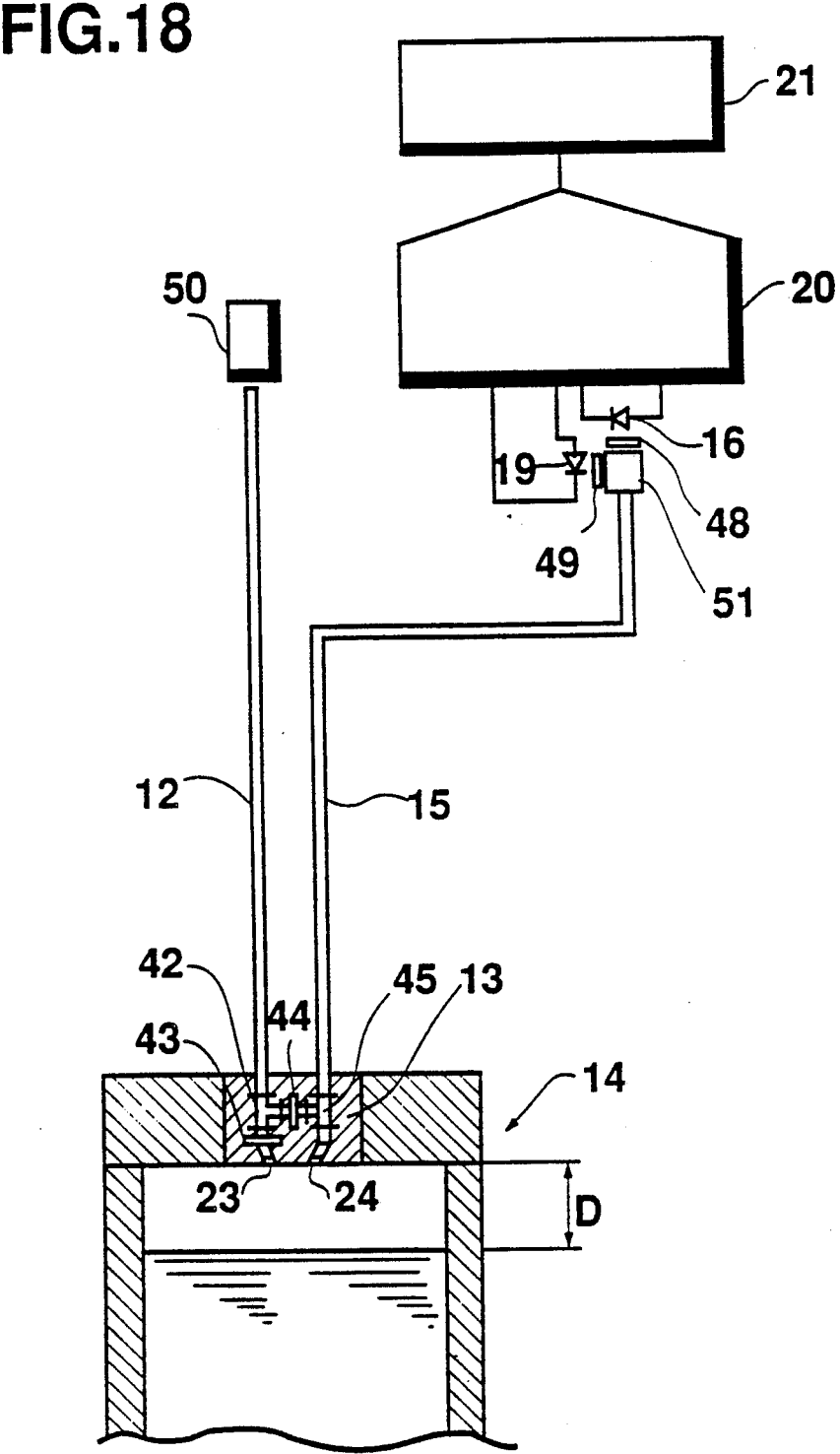
FIG. 18 is a diagram of a liquid level sensor using fifth embodiment of a fiber optical displacement sensor according to the present invention.

Referring now to FIG. 18, there is shown another liquid level sensor using another embodiment of a fiber optical displacement sensor according to the present invention.

In this fifth embodiment, the light source is a Zeeman effect type laser 50 which can emit two beams of different wavelengths, which are transmitted together as the first combined beam. To this first combined beam, the second photo coupler 42, first interference filter 43, second interference filter 44 are operated in the same manner as in the previous fourth embodiment. Also, the second combined beam is obtained by the third photo coupler 45 from the reflected beam and the reference beam emerging from the second interference filter 44 as in the fourth embodiment, which are transmitted through the reference optical fiber 15. This second combined beam is then divided into two by a beam splitter 51 at the end of the receiving optical fiber 15. One of the splitted beam is given to the first photo diode 16 through the third interference filter 48 while another one of the splitted beam is given to the second photo diode 19 through the fourth interference filter 49, as in the fourth embodiment.

As in the previous fourth embodiment above, because the projection beam component and the reference beam component are separated by means of the first and second interference filters 43 and 44, the Zeeman effect type laser 50 can continuously emit the projection beam and the reference beam. As a result, the processing at the operational circuit 20 and the output adjusting circuit 21 can also be performed continuously, and consequently the displacement measurement can also be performed continuously without any interruption in this fifth embodiment.

It can easily be seen that in this fifth embodiment, just as in the fourth embodiment, the use of multiple optical fibers in the previous embodiments has been dispensed by the use of photo couplers, interference filters, and combined beams, so that the same advantages as described for the fourth embodiment above can be obtained by this fifth embodiment.

It is to be noted that the interference filters used in this embodiment can be replaced by other types of device for separating beams of different wavelengths, such as polarization beam splitter, and the Zeeman effect type laser 50 may be replaced by other types of light source capable of emitting beams of two different wavelengths continuously, such as the first and the second LED 40A and 40B combined by the first photo coupler 41 of the fourth embodiment above.

Figure 19:
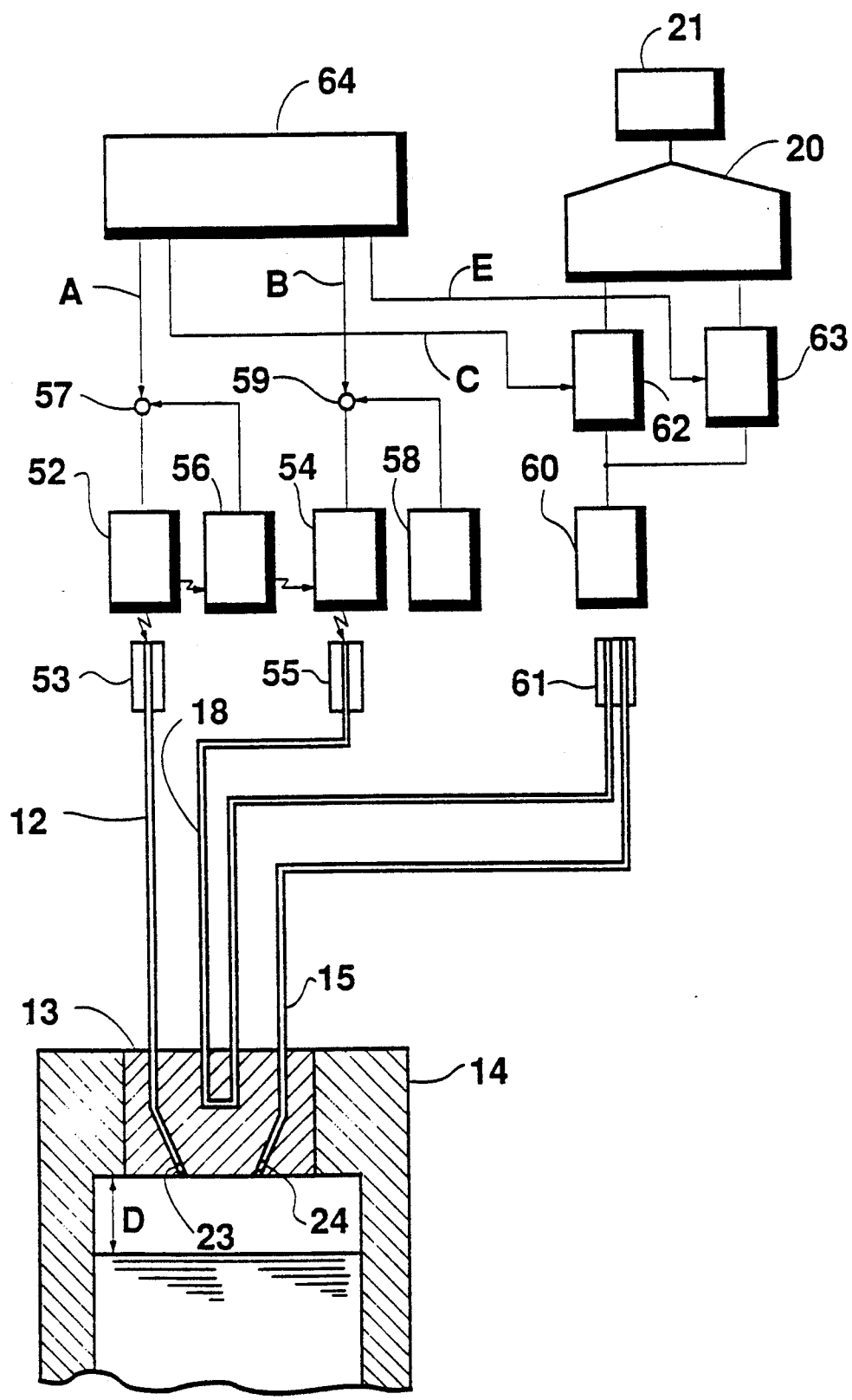
FIG. 19 is a diagram of a liquid level sensor using sixth embodiment of a fiber optical displacement sensor according to the present invention.

Referring now to FIG. 19, there is shown another liquid level sensor using another embodiment of a fiber optical displacement sensor according to the present invention.

Figure 20:
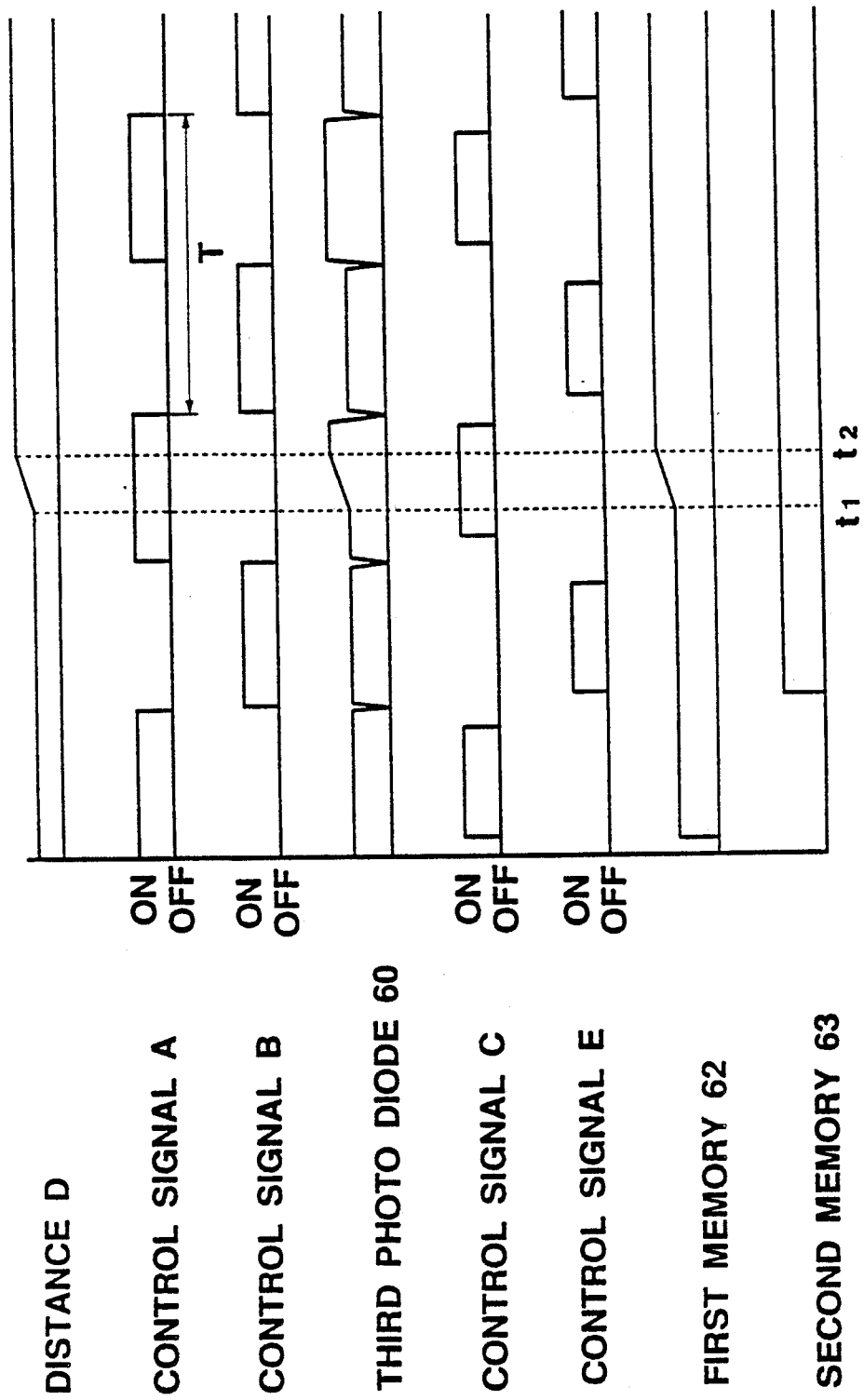
FIG. 20 is a timing chart for timing control by a timing circuit of the liquid level sensor of FIG. 19.

In this sixth embodiment, the projecting optical fiber 12 is coupled with a projection light source 52 through a first connector 53, and the reference optical fiber 18 is coupled with a reference light source 54 through a second connector 55. There is a first photo diode 56 associated with the projection light source 52 for providing a feedback to a first summing point 57 which controls the light intensity of the projection light source 52, and a second photo diode 58 associated with the reference light source 54 for providing a feedback to a second summing point 59 which controls the light intensity of the projection light source 54. Also, the receiving optical fiber 15 and the reference optical fiber 18 are coupled with a third photo diode 60 through one and the same third connector 61. The third photo diode 60 is connected to the operational circuit 20 through a first and a second memory 62 and 63. In addition, there is a timing circuit 64 which controls the timing of the projection light source 52, the reference light source 54, the first memory 62, and the second memory 63 by the control signals A, B, C, and E. As shown in a timing chart of FIG. 20, this controlling of timing is such that the projection light source 52 and the reference light 25 source 54 are activated by the control signals A and B alternatively at a prescribed period T to emit the projection beam and the reference beam, respectively, and a signal corresponding to the reflected beam received by the third photo diode 60 is temporarily stored in the first memory 62 by the control signal C before entering the operational circuit 20, while a signal corresponding to the reference beam received by the third photo diode 60 is temporarily stored in the second memory 63 control signal E before entering the operational circuit 20. In FIG. 20, the change in distance D occurring between a time t1 and a time t2 are exaggerated for the sake of clarity. In reality, the change is much slower than the period T. Now, it is necessary for the wavelength of the alternation between the projection light source 52 and the reference light source 54 to be about ten times larger than that of the vibration due to external disturbances, in order for contribution due to such external disturbances to be equally shared by the first memory 62 and the second memory 63. Since the wavelength of the vibration due to external disturbances are about 100 Hz at most, and since the the response wavelength of the third photo diode 60 can be as large as several hundred KHz, this implies that the period T can be variously chosen in a range of several μsec to 1 msec according to the response wavelength of the photo diode 60.

Thus, in this sixth embodiment, the use of more than one photo diode in the previous embodiments has been dispensed by the use of the memories and timing control so as to be able to achieve higher precision in measurements.

Referring now to FIG. 21, there is shown another liquid level sensor using another embodiment of a fiber optical displacement sensor according to the present invention.

In this seventh embodiment, the projection light source 52 in the previous sixth embodiment is replaced by a first light source 64 which generate a projection beam modulated at a first wavelength, and the reference light source 54 in the previous sixth embodiment is replaced by a second light source 65 which generate a reference beam modulated at a second wavelength different from the first wavelength. In addition, the first and second memories 62 and 63 in the previous sixth embodiment are replaced by a first and second demodulation circuits 66 and 67 which can demodulate a beam modulated at the first and second wavelengths, respectively.

It can easily be seen that in this seventh embodiment, just as in the sixth embodiment, the use of more than one photo diode in the previous embodiments has been dispensed by the use of the memories and timing control so as to be able to achieve higher precision in measurements.

It is to be noted that the first and second light sources 64 and 65 in this seventh embodiment may be replaced by the single light source shown in FIGS. 22(A) and (B). In this single light source of FIGS. 22(A) and (B), there is provided a disk 68 between a single light source 70 and the connectors 53 and 55 for the projecting and reference optical fibers 12 and 18. This disk 68 has two series of holes 69A and 69B of different sizes with different intervals arranged along two concentric circles, as in FIG. 22(A). The reference optical fiber 18 is connected to the inner series of holes 69a while the projecting optical fiber 12 is connected to the outer series of holes 69b. Thus, as the single light source 70 emits light beams and the disk 68 is continuously rotated, the beam for the projecting optical fiber 12 and the beam for the reference optical fiber 18 are differently modulated, just as in the first and second light sources 64 and 65 described above.

It is to be noted that although the above embodiments are all in forms of liquid level sensor, the similar embodiments can easily be constructed for a pressure sensor or temperature sensor by establishing correlation between the distance to be measured by the fiber optical displacement sensor with the pressure or the temperature, in manners of known pressure sensor and temperature sensor using the fiber optical displacement sensor.

Besides those already mentioned, many modifications and variations of the above embodiments may be made without departing from the novel and advantageous features of the present invention. Accordingly, all such modifications and variations are intended to be included within the scope of the appended claims.

What is claimed is:

1. A fiber optical displacement sensor for measuring displacement of a surface to be measured, comprising:
   light source means for continuously providing a projection beam to be projected onto the surface to be measured having a certain wavelength and a reference beam which carries no information related to the displacement to be measured having another wavelength different from that of the projection beam;
   projecting optical fiber for transmitting the projection beam to a vicinity of the surface to be measured and the reference beam;
   first photo coupler means between the light source means and the projecting optical fiber for combining the projection beam and the reference beam;
   receiving optical fiber for transmitting a reflected beam resulting from reflection of the projection beam by the surface to be measured which carries information related to the displacement to be measured and the reference beam;
   first filter means for separating out the reference beam transmitting through the projecting optical fibers from the projection beam;

second photo coupler means between the first filter means and receiving optical fiber for combining the the reference beam separated by the first filter means and the reflected beam;

second filter means for separating out the reference beam transmitting through the receiving optical fiber from the reflected beam;

beam conversion means for converting the reflected beam and the reference beam into corresponding electrical signals; and means for deriving the displacement to be measured in accordance with the corresponding electrical signals.

2. The fiber optical displacement sensor of claim 1, further comprising collimation means, attached to ends of the projecting and receiving optical fibers, for collimating the projection beam to be emitted from an end of the projecting optical fiber facing toward the surface to be measured and the reflected beam to be received by an end of the receiving optical fiber facing toward the surface to be measured.

3. The fiber optical displacement sensor of claim 2, wherein the collimation means comprises collimator lenses.

4. The fiber optical displacement sensor of claim 2, wherein the collimation means comprises optical fibers with a value NA of numerical aperture in a range of:

$$0 < NA \leq 0.5.$$

5. The fiber optical displacement sensor of claim 1, wherein the light source means includes a first light source for continuously providing the projection beam and a second light source for continuously providing the reference beam.

6. The fiber optical displacement sensor of claim 1, wherein the light source means comprises a single light source for continuously providing both of the projection beam and the reference beam.

7. The fiber optical displacement sensor of claim 1, wherein the projecting optical fibers and the receiving optical fibers are arranged to be substantially unifed together.

8. The fiber optical displacement sensor of claim 1, wherein the ends of the projecting and receiving optical fibers facing toward the surface to be measured are arranged to have angle $\theta$ with respect to a direction normal to the surface to be measured.

9. The fiber optical displacement sensor of claim 8, wherein the angle $\Theta$ is in a range of:

$$0° \leq \theta \leq 5°.$$

10. The fiber optical displacement sensor of claim 1, wherein the deriving means comprises an operational means for removing contribution due to external influences from the corresponding electrical signal for the reflected beam in accordance with the corresponding electrical signal for the reference beam to obtain a reflection signal, and means for determining the displacement of the surface to be measured on a basis of the reflection signal.

11. The fiber optical displacement sensor of claim 10, wherein the operational means performs calculational operations on the corresponding signals including at least one of addition, subtraction, multiplication, and division.

12. The fiber optical displacement sensor of claim 10, wherein the determining means performs calculational operations on the reflection signal including evaluations of logarithm and exponential.

13. The fiber optical displacement sensor of claim 10, wherein the determining means prepossesses values of the displacement of the surface to be measured corresponding to various different values for the reflection signal.

* * * * *